(12) United States Patent
Tomoda

(10) Patent No.: US 8,189,261 B2
(45) Date of Patent: May 29, 2012

(54) OPTICAL COMPONENT AND METHOD FOR MANUFACTURING THE SAME

(75) Inventor: Masaoki Tomoda, Sugamihara (JP)

(73) Assignee: Nikon-Essilor Co., Ltd., Tokyo (JP)

( * ) Notice: Subject to any disclaimer, the term of this patent is extended or adjusted under 35 U.S.C. 154(b) by 0 days.

(21) Appl. No.: 12/732,430

(22) Filed: Mar. 26, 2010

(65) Prior Publication Data
US 2010/0238557 A1 Sep. 23, 2010

Related U.S. Application Data

(63) Continuation of application No. PCT/JP2008/067431, filed on Sep. 26, 2008.

(30) Foreign Application Priority Data

Sep. 28, 2007 (JP) .................. P2007-254334

(51) Int. Cl.
G02B 1/10 (2006.01)
(52) U.S. Cl. ..................................... 359/588
(58) Field of Classification Search .......... 359/582, 359/586, 588
See application file for complete search history.

(56) References Cited

U.S. PATENT DOCUMENTS

| | | | |
|---|---|---|---|
| 5,332,618 A | 7/1994 | Austin | |
| 5,725,959 A | 3/1998 | Terada et al. | |
| 5,933,273 A * | 8/1999 | Ferrante et al. | 359/359 |
| 2003/0218798 A1 | 11/2003 | Kanazawa et al. | |
| 2004/0036973 A1 | 2/2004 | Iori et al. | |
| 2004/0047047 A1 | 3/2004 | Yamaguchi et al. | |
| 2006/0109545 A1 | 5/2006 | Kanazawa et al. | |
| 2007/0159697 A1* | 7/2007 | Terayama | 359/586 |

FOREIGN PATENT DOCUMENTS

| | | |
|---|---|---|
| EP | 0928977 A1 | 7/1999 |
| EP | 1273639 A1 | 1/2003 |
| EP | 1384736 A1 | 1/2004 |
| EP | 1566666 A1 | 8/2005 |
| EP | 1816489 A2 | 8/2007 |

(Continued)

OTHER PUBLICATIONS

International Search Report in International Application No. PCT/JP2008/067431 (Oct. 24, 2008).

(Continued)

*Primary Examiner* — Stephone Allen
*Assistant Examiner* — Kimberly N Kakalec
(74) *Attorney, Agent, or Firm* — Finnegan, Henderson, Farabow, Garrett, Dunner, L.L.P.

(57) ABSTRACT

An optical component includes an antireflection film that is a multilayer film having alternately-laminated six or more layers including high refractive index layers and low refractive index layers; wherein a first layer of the antireflection film deposited closest to the substrate is a high refractive index layer; $\lambda$ satisfies 480 nm$\leq\lambda\leq$530 nm where $\lambda$ is the wavelength of light incident into the antireflection film; an optical thickness D1 of the first layer satisfies $0.02\lambda\leq D1\leq 0.04\lambda$; an optical thickness Dm of a layer of the antireflection film that is located fifth from an outermost layer deposited furthest from the substrate satisfies $0.19\lambda\leq Dm\leq 0.75\lambda$; a total physical thickness dt of the entire antireflection film satisfies 350 nm$\leq$dt$\leq$480 nm; and a total physical thickness da of the low refractive index layers satisfies $0.65\,dt\leq da\leq 0.80\,dt$.

7 Claims, 5 Drawing Sheets

FOREIGN PATENT DOCUMENTS

| | | |
|---|---|---|
| JP | 4-55615 | 9/1992 |
| JP | 6-337302 | 12/1994 |
| JP | 9-258003 | 10/1997 |
| JP | 11-30703 | 2/1999 |
| JP | 2004-46079 | 2/2004 |
| JP | 2004-145283 | 5/2004 |
| JP | 2005-31298 | 2/2005 |
| JP | 2006-119525 | 5/2006 |
| JP | 2006-251760 | 9/2006 |
| JP | 2007-94150 | 4/2007 |
| JP | 2007-127681 | 5/2007 |
| JP | 2007-127725 | 5/2007 |
| WO | WO 2007/071723 A2 | 6/2007 |

OTHER PUBLICATIONS

European Supplementary Search Report and Search Opinion completed Oct. 6, 2010 for related European application No. 08833003.0.
English translation of Written Opinion of the International Searching Authority issued for international application No. PCT/JP2008/067431, filed Sep. 26, 2008.
English translation of Japanese Examined Patent Application Publication No. JP 2006-251760 A, published Sep. 21, 2006.
European Supplementary Search Report and Search Opinion mailed on Oct. 19, 2010 for related European application No. 08833003.0.
International Search Report in International Application No. PCT/JP2008/067431 mailed on Nov. 4, 2008.

* cited by examiner

OPTICAL COMPONENT AND METHOD FOR MANUFACTURING THE SAME

CROSS-REFERENCE TO RELATED APPLICATION

This is a Continuation Application of International Application No. PCT/JP2008/067431, filed Sep. 26, 2008 which claims priority to Japanese Patent Application No. 2007-254334 filed Sep. 28, 2007. The contents of the aforementioned applications are incorporated herein by reference.

BACKGROUND

1. Field of the Invention

The present invention relates to an optical component and a method for manufacturing the same.

2. Description of Related Art

Recently, plastic lenses are often used as spectacle lenses for their advantages in being lightweight, having improved shock resistance, and being easy to color. The plastic lenses used in spectacle lenses typically have antireflection films deposited on both surfaces thereof in order to prevent surface reflection.

Such antireflection films for spectacle lenses are required to have excellent optical properties including low reflection properties (i.e., low reflection properties in a wide wavelength area) in a visible region of 400 nm to 700 nm and green reflection color. The antireflection films are also required to have excellent physical properties, such as adhesion, abrasive resistance, heat resistance and chemical resistance.

As disclosed in the following Patent Documents, i.e., Japanese Unexamined Patent Application First Publication No. H11-30703, Japanese Unexamined Patent Application, First Publication No. 2006-251760, and Japanese Unexamined Patent Application, First Publication No. 2007-127681, optical components including a plastic substrate and an antireflection film deposited on the substrate have been proposed as optical components for, for example, spectacle lenses.

It has been difficult, however, to obtain an antireflection film having satisfactory physical properties with these related art techniques. This is because many of the required physical properties are in trade-off relationships. For example, a larger film thickness of the antireflection film provides an improved abrasive resistance, but tends to cause a compromised adhesion between the antireflection film and a hard coat, and a compromised heat resistance. Also, although an increased ratio of the low refractive index layers in the antireflection film provides improved heat resistance, it becomes difficult to provide low reflection properties in a wide area.

A propose of some aspects of the invention is to provide an optical component of excellent optical properties, well-balanced adhesion, abrasive resistance and heat resistance.

SUMMARY

Provided according to a first aspect of the present invention is an optical component including: a plastic substrate; and an antireflection film disposed on the substrate, wherein the antireflection film is a multilayer film having alternately-laminated six or more layers including high refractive index layers and low refractive index layers; a first layer of the antireflection film deposited closest to the substrate is a high refractive index layer; $\lambda$ satisfies 480 nm$\leq \lambda \leq$530 nm where $\lambda$ is the wavelength of light incident into the antireflection film; an optical thickness D1 of the first layer satisfies $0.02\lambda \leq D1 \leq 0.04\lambda$; an optical thickness Dm of a layer of the antireflection film that is located fifth from an outermost layer deposited furthest from the substrate satisfies $0.19\lambda \leq Dm \leq 0.75\lambda$; a total physical thickness dt of the entire antireflection film satisfies 350 nm$\leq$dt$\leq$480 nm; and a total physical thickness da of the low refractive index layers satisfies 0.65 dt$\leq$da$\leq$0.80 dt.

Provided according to a second aspect of the present invention is an optical component including: a plastic substrate and an antireflection film deposited on the substrate, wherein the antireflection film is a multilayer film having alternately-laminated six or more layers including high refractive index layers and low refractive index layers; a first layer of the antireflection film deposited closest to the substrate is a high refractive index layer; $\lambda$ satisfies 480 nm$\leq \lambda \leq$530 nm where $\lambda$ is the wavelength of light incident into the antireflection film; an optical thickness D1 of the first layer satisfies $0.02\lambda \leq D1 \leq 0.04\lambda$; an optical thickness D4 of a fourth layer of the antireflection film located fourth from the substrate satisfies $0.19\lambda \leq D4 \leq 0.75\lambda$; a total physical thickness dt of the entire antireflection film satisfies 350 nm$\leq$dt$\leq$480 nm; a total physical thickness da of the low refractive index layers satisfies 0.65 dt$\leq$da$\leq$0.80 dt.

Provided according to a third aspect of the present invention is a method for manufacturing an optical component which includes a plastic substrate and an antireflection film deposited on the substrate, the method comprising: heating the substrate; and, after temperature of the substrate is adjusted to a predetermined temperature by the heating, depositing the antireflection film having a multilayer including six or more layers on the substrate by alternately laminating high refractive index layers and low refractive index layers, wherein in the depositing the antireflection film: $\lambda$ satisfies 480 nm$\leq \lambda \leq$530 nm where $\lambda$ is the wavelength of light incident into the antireflection film; a first layer of the antireflection film deposited closest to the substrate is a high refractive index layer; an optical thickness D1 of the first layer satisfies $0.02\lambda \leq D1 \leq 0.04\lambda$; an optical thickness Dm of a layer of the antireflection film that is located fifth from an outermost layer deposited furthest from the substrate satisfies $0.19\lambda \leq Dm \leq 0.75\lambda$; a total physical thickness dt of the entire antireflection film satisfies 350 nm$\leq$dt$\leq$480 nm; and a total physical thickness da of the low refractive index layers satisfies 0.65 dt$\leq$da$\leq$0.80 dt.

Provided according to a fourth aspect of the present invention is a method for manufacturing an optical component which includes a plastic substrate and an antireflection film deposited on the substrate, the method comprising: heating the substrate; and, after temperature of the substrate is adjusted to a predetermined temperature, depositing the antireflection film, on the substrate by alternately laminating high refractive index layers and low refractive index layers, wherein in depositing the antireflection film: a first layer of the antireflection film deposited closest to the substrate is a high refractive index layer; $\lambda$ satisfies 480 nm$\leq \lambda \leq$530 nm where $\lambda$ is the wavelength of light incident into the antireflection film; an optical thickness D1 of the first layer satisfies $0.02\lambda \leq D1 \leq 0.04\lambda$; an optical thickness D4 of a fourth layer of the antireflection film located fourth from the substrate satisfies $0.19\lambda \leq D4 \leq 0.75\lambda$; a total physical thickness dt of the entire antireflection film satisfies 350 nm$\leq$dt$\leq$480 nm; and a total physical thickness da of the low refractive index layers satisfies 0.65 dt$\leq$da$\leq$0.80 dt.

According to some aspects of the invention, performance degradation in optical components can be prevented.

DESCRIPTION OF EMBODIMENTS

Figure 1:
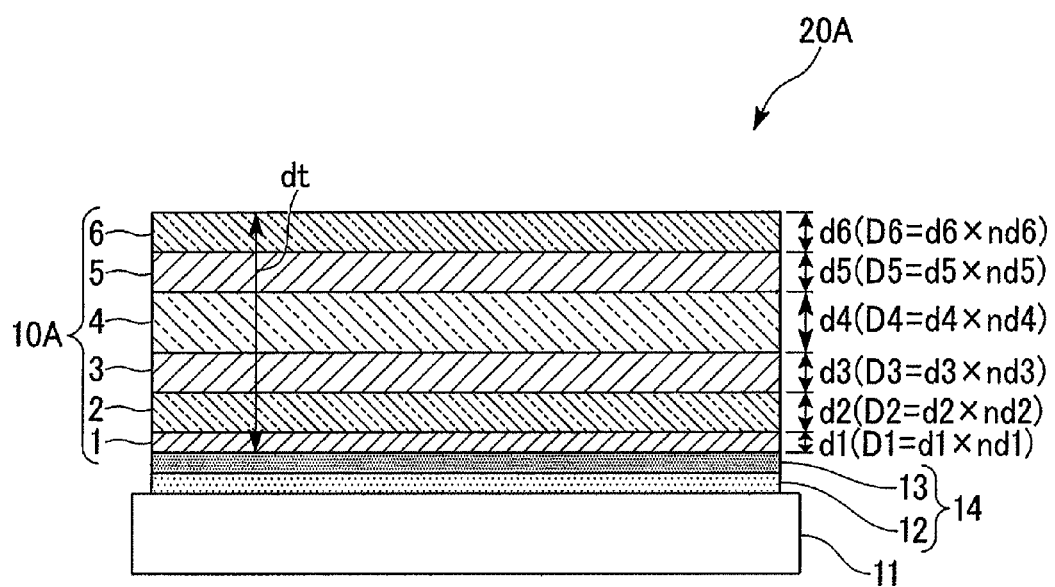
FIG. 1 schematically illustrates an exemplary optical component according to a first embodiment.

Referring now to the drawings, embodiments of the invention will be described. These embodiments are for illustrative purposes only and are not meant to be limiting.
(First Embodiment)

A first embodiment will be described. FIG. 1 schematically illustrates an exemplary optical component 20A according to the first embodiment. In the present embodiment, the optical component 20A is, for example, a spectacle lens.

As illustrated in FIG. 1, the optical component 20A includes a plastic substrate 11 and an antireflection film 10A deposited on the substrate 11. In the present embodiment, an intermediate layer 14 is disposed between a surface of the substrate 11 and the antireflection film 10A. In the present embodiment, the intermediate layer 14 includes a primer layer 12 and a hard-coat layer 13.

In the following description, the layer 14 and the film 10A deposited on the surface of the substrate 11 will be described mainly. In practice, a layer and a film are similar to the layer 14 and the film 10A respectively deposited on the surface are deposited on a back surface of the substrate 11.

The substrate 11 is illustrated as a planar substrate in FIG. 1 for the ease of illustration. However, the surface (and the back surface) of the substrate 11 used in a spectacle lens typically has a curvature and is thus curved. The layer 14 and the film 10A which will be deposited on a curved surface (and a curved back surface) of the substrate 11 are also curved along the surface (and the back surface) of the substrate 11.

The substrate 11 is made with plastic. The substrate 11 may be made containing transparent plastic materials, such as an acrylic-based resin, a thiourethane-based resin, a methacrylic-based resin, an allyl-based resin, an episulfide-based resin, a polycarbonate-based resin, a polyurethane-based resin, a polyester-based resin, a polystyrene-based resin, an episulfide resin, a polyether sulfone resin poly 4-methylpentene-1 resin, a diethylene glycol bis(allyl carbonate) resin (CR-39), a polyvinyl chloride resin, a halogen-containing copolymer or a sulfur-containing copolymer. In the present embodiment, a refractive index (nd) of the substrate 11 may be, for example, at least one of 1.50, 1.60, 1.67 and 1.74. Preferably, when the substrate 11 is to have the refractive index of 1.6, the substrate 11 may be made containing allyl carbonate-based resin, acrylate-based resin, methacrylate-based resin and thiourethane-based resin. The substrate 11 is not necessarily transparent. The substrate 11 may also contain an inorganic material.

The intermediate layer 14 is disposed between the substrate 11 and the antireflection film 10A. The intermediate layer 14 is in contact with the surface of the substrate 11. The intermediate layer 14 is also in contact with the antireflection film 10A.

In the present embodiment, the intermediate layer 14 includes a primer layer 12 and a hard-coat layer 13. The primer layer 12 is in contact with the substrate 11. The primer layer 12 is disposed between the substrate 11 and the hard-coat layer 13. The primer layer 12 provides adhesion between the substrate 11 and the hard-coat layer 13 and thus functions as an adhesion layer. The primer layer 12 absorbs impact occurring on the optical component 20A and thus functions as an impact-absorbing layer.

In the present embodiment, the primer layer 12 includes a polyurethane-based resin as a major component. In the present embodiment, the primer layer 12 is made with a polyurethane-based resin containing, for example, fine particles of an inorganic material. The primer layer 12 may include at least one of an acrylic-based resin, a methacrylic-based resin and an organic silicon-based resin. The thickness (physical thickness) of the primer layer 12 is, for example, not less than 0.5 μm to not more than 1.0 μm.

The primer layer 12 may be deposited on the substrate 11 through immersion of the substrate 11 in a solution for forming the primer layer 12. The solution for forming the primer layer 12 may be, for example a liquid obtained by mixing a resin and an inorganic oxide fine particle sol which constitutes the primer layer 12 to a water- or alcohol-based solvent.

The hard-coat layer 13 is disposed between the primer layer 12 and the antireflection film 10A. The hard-coat layer 13 protects the substrate 11 (i.e., prevents damage to the substrate 11).

The hard-coat layer 13 may be, for example, an organosiloxane-based hard-coat layer. The organosiloxane-based hard-coat layer includes an organosiloxane-based resin and fine particles of inorganic oxide. The inorganic oxide includes at least one of oxides of rutile-type titanium oxide, silicon, tin, zirconium and antimony. The hard-coat layer 13 may also be a colloidal silica-containing organic silicon-based resin as disclosed in Japanese Examined Patent Application, Second Publication No. H4-55615. The thickness (physical thickness) of the hard-coat layer 13 is, for example, not less than 2 μm to not more than 4 μm.

The hard-coat layer 13 can be deposited on the primer layer 12 through immersion of the substrate 11 having the primer layer 12 deposited thereon in a solution for forming the hard-coat layer 13. The solution for forming the hard-coat layer 13 may be, for example a liquid obtained by mixing resin and inorganic oxide fine particle sol which constitutes the hard-coat layer 13 to a water- or alcohol-based solvent.

In the case where the intermediate layer 14 including the primer layer 12 and the hard-coat layer 13 has the same refractive index as the refractive index of the substrate 11, it is possible to prevent both an occurrence of interference fringes due to reflection of light on an interface between the intermediate layer 14 and the substrate 11, and a decrease in transmittance. It is therefore preferred to adjust the refractive index of the intermediate layer 14 in accordance with, for example, properties of the substrate 11. The refractive index of the intermediate layer 14 (and the primer layer 12, the hard-coat layer 13) can be adjusted by, for example, selecting a type (i.e., physical properties) of resin which mainly constitutes the intermediate layer 14 or selecting a type (i.e., physical properties) of the fine particles added to that resin.

Although the intermediate layer 14 includes the primer layer 12 and the hard-coat layer 13 in the present embodiment, the primer layer 12 may be omitted. Alternatively, both the primer layer 12 and the hard-coat layer 13 may be omitted.

The antireflection film 10A is a multilayer film including six or more alternately-laminated layers including high refractive index layers and low refractive index layers. In the present embodiment, the refractive index (nd) of the high refractive index layer is not lower than 1.90 and not higher than 2.60. The refractive index (nd) of the low refractive index layer is not lower than 1.36 and not higher than 1.50. The antireflection film 10A is deposited on the hard-coat layer 13 of the intermediate layer 14. The antireflection film 10A is in contact with the hard-coat layer 13. The antireflection film 10A prevents reflection of incident light. In the present embodiment, the antireflection film 10A prevents reflection of visible light (having wavelength of not shorter than 400 nm and not longer than 700 nm).

In the present embodiment, the antireflection film 10A includes a first layer 1, a second layer 2, a third layer 3, a fourth layer 4, a fifth layer 5 and a sixth layer 6. The first layer 1 is a six-layered multilayer film deposited closest to the substrate 11. The second layer 2 is deposited second-closest to the substrate 11. The third layer 3 is deposited third-closest to the substrate 11. The fourth layer 4 is deposited fourth-closest to the substrate 11. The fifth layer 5 is deposited fifth-closest to the substrate 11. The sixth layer 6 is deposited sixth-closest to the substrate 11. The first layer 1 is in contact with the hard-coat layer 13.

In the present embodiment, the first layer 1 of the antireflection film 10A deposited closest to the substrate 11 is a high refractive index layer. The third layer 3 and the fifth layer 5 are also high refractive index layers. In the present embodiment, the sixth layer 6 of the antireflection film 10A deposited furthest from the substrate 11 is a low refractive index layer. The second layer 2 and the fourth layer 4 are also low refractive index layers.

The first layer 1 to the sixth layer 6 have a thickness (physical thickness) of d1 to d6, respectively. The first layer 1 to the sixth layer 6 have a refractive index nd1 to nd6, respectively. The first layer 1 to the sixth layer 6 have an optical thickness D1 to D6, respectively. The optical thickness is the product of the physical thickness and the refractive index. For example, $D1=d1 \times nd1$.

In the present embodiment, the high refractive index layers, i.e., the first layer 1, the third layer 3 and the fifth layer 5, include zirconium (Zr). In the present embodiment, the high refractive index layer is an oxide $ZrO_2$ (zirconium dioxide) of zirconium (Zr) layer. The high refractive index layer may alternatively be at least one of oxides of titanium (Ti) and tantalum (Ta) layer. The high refractive index layer may be, for example, $TiO_2$ (titanium dioxide) or $Ta_2O_5$ (tantalum dioxide) layer. The high refractive index layer may be an oxide of two or more alloys of zirconium (Zr), titanium (Ti) and tantalum (Ta). The high refractive index layer may be, for example, $AL_2O_3$ (aluminum oxide: alumina), $Y_2O_3$ (yttrium dioxide), $HfO_2$ (hafnium dioxide) or niobium dioxide ($Nb_2O_5$) layer.

In the present embodiment, the low refractive index layers, i.e., the second layer 2, the fourth layer 4 and the sixth layer 6 include silicon (Si). In the present embodiment, the low refractive index layer is an oxide $SiO_2$ (silicon dioxide) of silicon (Si) layer.

As described above, in the present embodiment, the first layer 1 is a high refractive index layer ($ZrO_2$). Such a configuration provides adhesion between the first layer 1 and the intermediate layer 14. That is, adhesion (i.e., adhesive strength) between the high refractive index layer ($ZrO_2$) and the intermediate layer 14 is larger than that between the low refractive index layer ($SiO_2$) and the intermediate layer 14. Even if the intermediate layer 14 is omitted, adhesion (i.e., adhesive strength) between the high refractive index layer ($ZrO_2$) and the substrate 11 is still larger than that between the low refractive index layer ($SiO_2$) and the substrate 11.

In the present embodiment, the optical thickness D1 of the first layer 1 satisfies: $0.02\lambda \leq D1 \leq 0.04\lambda$ (2A), where X, is the wavelength of light incident into the antireflection film 10A and 480 nm $\leq \lambda \leq$ 530 nm (1A). Such a configuration provides adhesion between the antireflection film 10A (i.e., the first layer 1) and the intermediate layer 14 or the substrate 11 and thus prevents a decrease in transmittance of the antireflection film 10A. If the optical thickness D1 of the first layer 1 is excessively small, it is difficult to provide sufficient adhesion between the first layer 1 and the intermediate layer 14 (substrate 11). Such insufficient adhesion may lead to a decrease in durability and impairments in optical properties of the optical component 20A which includes the antireflection film 10A. In particular, the antireflection film 10A may be peeled off. If, on the other hand, the optical thickness D1 of the first layer 1 is excessively large, it is impossible to provide sufficient transmittance. There is therefore a possibility that the optical properties of the optical component 20A may be impaired. When the optical thickness D1 of the first layer 1 satisfies the condition (2A), impairments in the optical properties and a decrease in durability of the optical component 20A can be prevented.

In the present embodiment, the optical thickness D4 of the fourth layer 4 satisfies: $0.19\lambda \leq D4 \leq 0.75\lambda$ (3A). As described above, since the thickness of the fourth layer 4 is larger than those of other low refractive index layers, hardness can be imparted to the antireflection film 10A while the antireflection film 10A still has the antireflection function. Thus, durability, such as abrasive resistance, can be provided. Heat resistance of the antireflection film 10A can also be improved. When the optical thickness D4 of the fourth layer 4 satisfies the condition (3A), impairments in the optical properties and a decrease in durability of the optical component 20A can be prevented. The optical thickness D4 of the fourth layer 4 may alternatively satisfy $0.25\lambda \leq D4 \leq 0.50\lambda$ (3A').

In the present embodiment, the physical thickness dt of the entire antireflection film 10A satisfies 350 nm $\leq$ dt $\leq$ 480 nm (4A), where dt=d1+d2+d3+d4+d5+d6 in the present embodiment. With this configuration, durability, such as abrasive-resistance, can be provided while the antireflection film 10A still has the antireflection function. When the physical thickness dt of the entire antireflection film 10A satisfies the condition (4A), impairments in the optical properties and a decrease in durability of the optical component 20A can be prevented.

In the present embodiment, the total physical thickness da of the low refractive index layers satisfies 0.65 dt $\leq$ da $\leq$ 0.80 dt (5A), where da=d2+d4+d6 in the present embodiment. With the increased ratio of the low refractive index layers in the antireflection film 10A, hardness can be imparted to the antireflection film 10A while the antireflection film 10A still has the antireflection function. Thus, durability, such as abrasive resistance and heat resistance, can be provided. When the total physical thickness da of the low refractive index layers satisfies the condition (5A), impairments in the optical properties and a decrease in durability of the optical component 20A can be prevented.

Next, an exemplary method for manufacturing the optical component 20A will be described. In the present embodiment, the method for manufacturing the optical component 20A includes a process of heating the substrate 11 and, a process of depositing the antireflection film 10A, after the temperature of the substrate 11 is adjusted to a predetermined temperature (about 70° C. in the present embodiment), on the substrate 11 by alternately laminating the high refractive index layer and the low refractive index layer. In the present embodiment, the antireflection film 10A is vacuum deposited.

Figure 2:
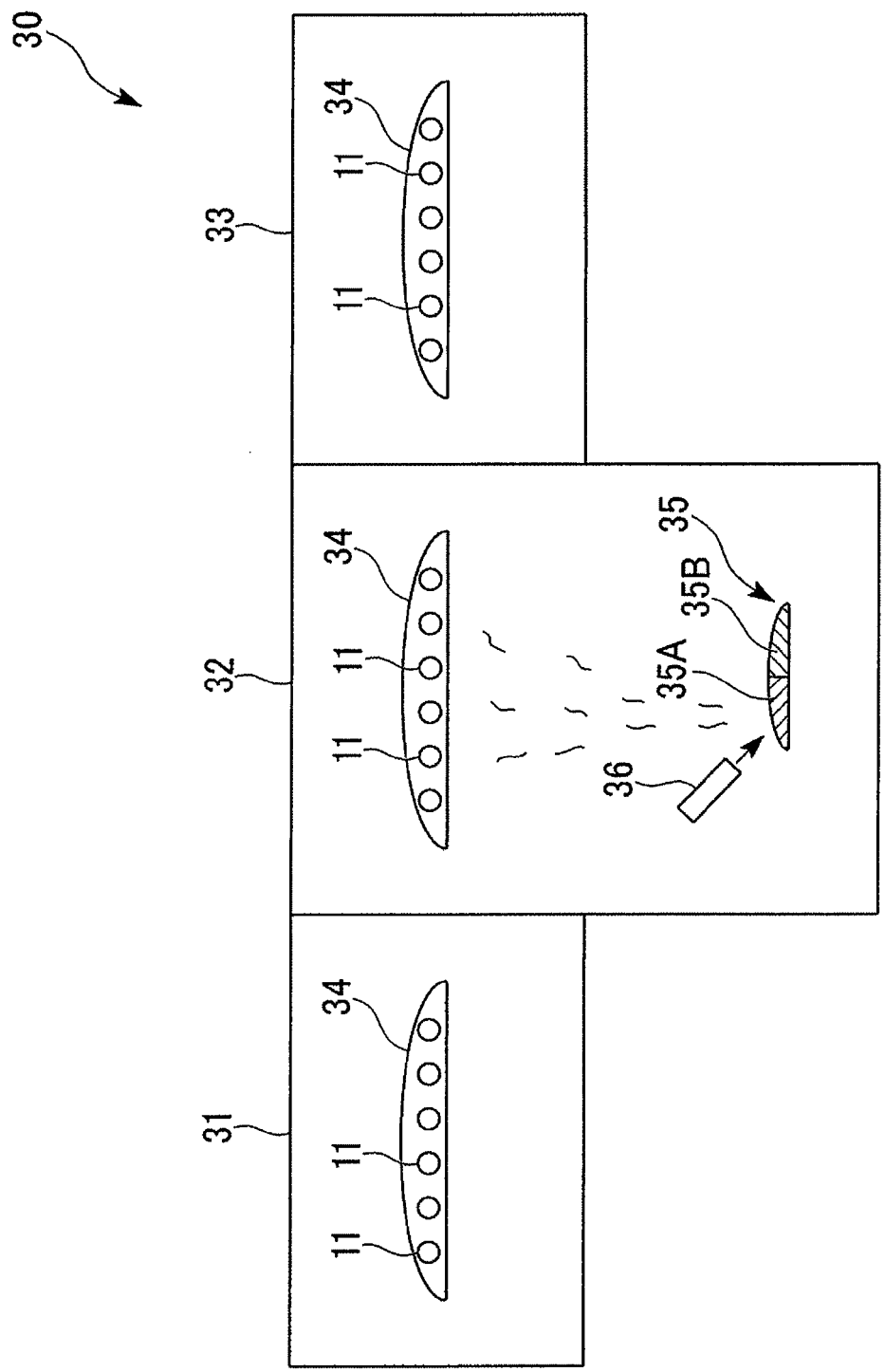
FIG. 2 schematically illustrates an exemplary vapor deposition apparatus according to the first embodiment.

FIG. 2 illustrates an exemplary vapor deposition apparatus 30 used to deposit the antireflection film 10A of the optical component 20A. As illustrated in FIG. 2, the vapor deposition apparatus 30 includes a first chamber 31, a second chamber 32 and a third chamber 33. The vapor deposition apparatus 30 can vacuumize the first, second and third chambers 31, 32 and 33. The vapor deposition apparatus 30 can control the temperature inside of the first, second and third chambers 31, 32 and 33.

The vapor deposition apparatus 30 includes holding members 34 disposed in each of the first, second and third chambers 31, 32 and 33. Each of the holding members 34 has a curved and rotating upper surface (i.e., holding surface). The holding member 34 can hold a plurality of substrates 11 on the upper surface thereof.

A vapor deposition source 35 of the vapor deposition apparatus 30 is disposed in the second chamber 32. The vapor deposition source 35 includes a first vapor deposition source 35A including zirconium oxide ($ZrO_2$) and a second vapor deposition source 35B including silicon dioxide ($SiO_2$). The second chamber 32 is provided with a light source device 36 which can irradiate the vapor deposition source 35 with beams. When the vapor deposition source 35 is irradiated with the beams emitted from the light source device 36, a material (i.e., gas) for forming the antireflection film 10A is emitted from the vapor deposition source 35. For example, when the light source device 36 irradiates the first vapor deposition source 35A with beams, gasified $ZrO_2$ is emitted from the first vapor deposition source 35A and is supplied to the substrate 11 held by the holding member 34. Similarly, when the light source device 36 irradiates the second vapor deposition source 35B with beams, gasified $SiO_2$ is emitted from the second vapor deposition source 35B and is supplied to the substrate 11 held by the holding member 34. The vapor deposition apparatus 30 can alternately laminate the high refractive index layer and the low refractive index layer on the substrate 11 held by the holding member 34 by alternately irradiating the first vapor deposition source 35A with beams and irradiating the second vapor deposition source 35B with beams.

A vapor deposition source which includes zirconium (Zr) may be used as the first vapor deposition source 35A. The first vapor deposition source 35A may be irradiated with beams while introducing oxygen into the second chamber 32 to laminate the high refractive index layer.

In the present embodiment, the substrate 11 having the antireflection film 10A not yet deposited thereon is held by the holding member 34 provided in the first chamber 31. The temperature of the substrate 11 is controlled in the first chamber 31. The first chamber 31 heats the substrate 11 to about 70° C. While the substrate 11 is being heated in the first chamber 31, the antireflection film 10A is deposited in the second chamber 32 on another substrate 11 which has already been heated in the first chamber 31. After the antireflection film 10A is deposited on the substrate 11 in the second chamber 32, the holding member 34 holding the substrate 11 is moved into the third chamber 33. At the same time, the holding member 34 holding the substrate 11 heated in the first chamber 31 is moved into the second chamber 32. The vapor deposition apparatus 30 then starts deposition of the antireflection film 10A on the substrate 11 freshly moved into the second chamber 32. The substrate 11 (i.e., the optical component 20A) held by the holding member 34, which has been moved into the third chamber 33 from the second chamber 32, is then taken out of the third chamber 33. Additional processes may be executed as needed.

As described above, according to the present embodiment, the configuration of the antireflection film 10A is determined to satisfy the above conditions in the antireflection film 10A including the alternately-laminated high refractive index layers and the low refractive index layers. Therefore, impairments in performance, such as optical properties and durability, of the optical component 20A can be prevented. Thus, blurry vision can be prevented when the optical component 20A is used as a spectacle lens, for example.

In the present embodiment, the substrate 11 is heated to a predetermined temperature before the antireflection film 10A is deposited thereon. That is, the antireflection film 10A is deposited on the substrate 11 of which temperature has been adjusted to a predetermined temperature. In this manner, the antireflection film 10A can be deposited favorably on the substrate 11.

In the present embodiment, when the wavelength λ of the light incident into the antireflection film 10A is in a range of not shorter than 480 nm to not longer than 530 nm, a peak of reflectance of the antireflection film 10A is not lower than 0.6% and not higher than 1.5% and reflection color is green. If the wavelength λ is in a range of not less than 420 nm to not more than 480 nm or in a range of not less than 600 nm to not more than 660 nm, the minimum reflectance of the antireflection film 10A is not less than 0.1% and not more than 0.3% and reflection color is green. Accordingly, the optical component 20A has a desired color.

(Second Embodiment)

Next, a second embodiment will be described. In the following description, components the same as or similar to those of the foregoing embodiment will be denoted by the same reference numerals and description thereof will be simplified or even omitted.

Figure 3:
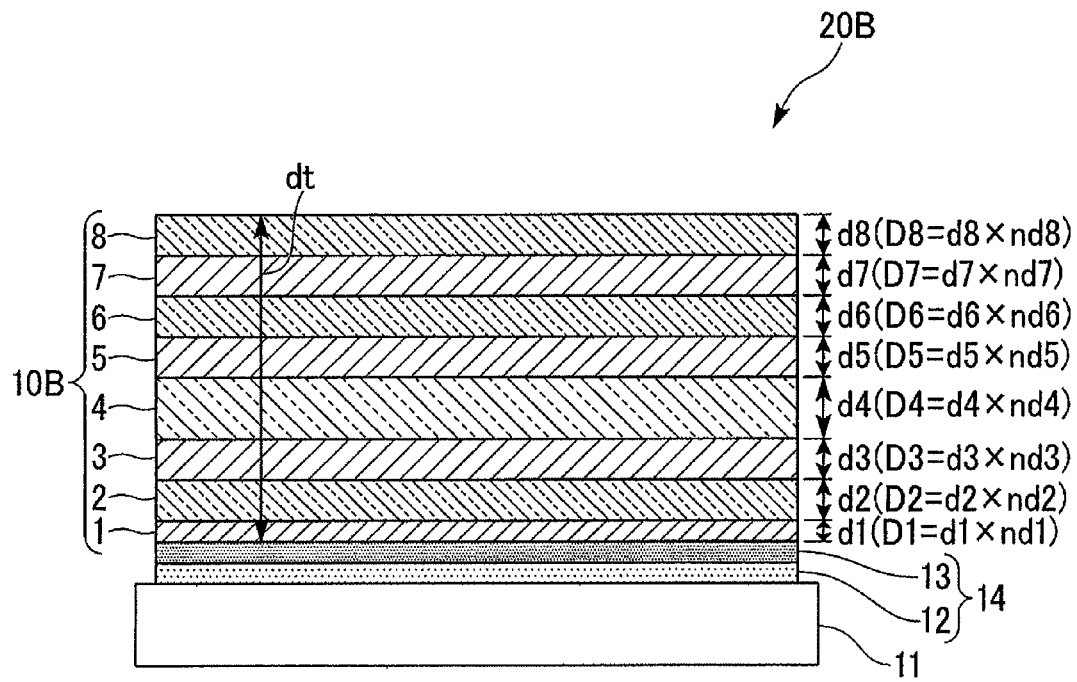
FIG. 3 schematically illustrates an exemplary optical component according to a second embodiment.

FIG. 3 schematically illustrates an optical component 20B according to the second embodiment. An antireflection film 10B of the optical component 20B illustrated in FIG. 3 is a multilayer film having eight layers.

In the present embodiment, the first layer 1, the third layer 3, the fifth layer 5 and the seventh layer 7 are high refractive index layers which is a $ZrO_2$ layer. The second layer 2, the fourth layer 4, the sixth layer 6 and the eighth layer 8 are low refractive index layers which is a $SiO_2$ layer. That is, the first layer 1 of the antireflection film 10B deposited closest to the substrate 11 is a high refractive index layer and the eighth layer 8 of antireflection film 10B deposited furthest from the substrate 11 is a low refractive index layer.

The first layer 1 to the eighth layer 8 have a thickness (physical thickness) of d1 to d8, respectively. The first layer 1 to the eighth layer 8 have the refractive index of nd1 to nd8, respectively. The first layer 1 to the eighth layer 8 have an optical thickness of D1 to D8, respectively.

In the present embodiment, the antireflection film 10B is a multilayer film having eight layers. The optical thickness D4 of the fourth layer 4 of the antireflection film 10B that is located fifth from the eighth layer 8 deposited furthest from the substrate 11 satisfies the condition (3A) described above.

Also in the present embodiment, a configuration of the antireflection film 10B is defined to satisfy the foregoing conditions. Accordingly, the optical component 20B of desired performance can be provided also in the present embodiment.

(Third Embodiment)

Next, a third embodiment will be described. In the following description, components that are the same as or similar to those of the foregoing embodiment will be denoted by the same reference numerals and description thereof will be simplified or even omitted.

Figure 4:
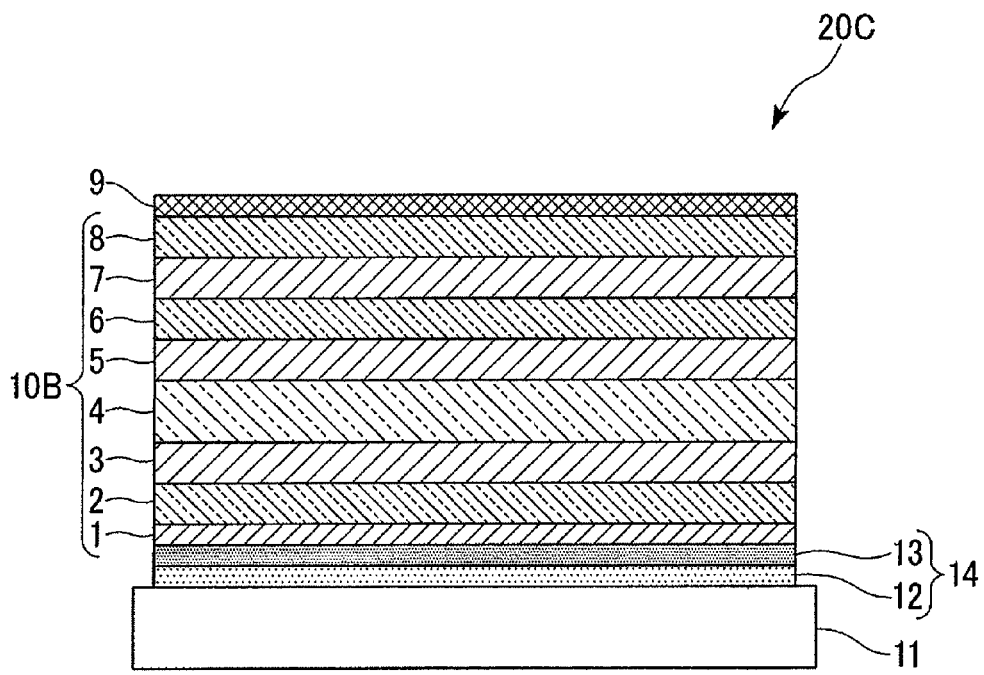
FIG. 4 schematically illustrates an exemplary optical component according to a third embodiment.

FIG. 4 schematically illustrates an exemplary optical component 20C according to the third embodiment. As illustrated in FIG. 4, the optical component 20C includes a water-oil-repelling film 9 which covers the antireflection film 10B. A configuration the optical component 20C is the same as that of the optical component 20B according to the second embodiment except that the water-oil-repelling film 9 is provided. The water-oil-repelling film 9 covers the eighth layer 8. The water-oil-repelling film 9 is deposited on an outermost layer of the antireflection film 10B which is deposited furthest from the substrate 11.

The water-oil-repelling film 9 includes, for example, a fluorine-substituted alkyl group-containing organic silicon compound as a major component and is liquid-repellant (i.e., water-repellent and oil-repellent). The water-oil-repelling film decreases surface energy of the optical component and prevents formation of traces of water droplets and occurrence of contamination. The water-oil-repelling film also improves slidability on the surface of the optical component and thus improves abrasive-resistance.

The fluorine-substituted alkyl group-containing organic silicon compound is selected from those represented by the following general formulae (1) to (6).

[Chemical Formula 1]

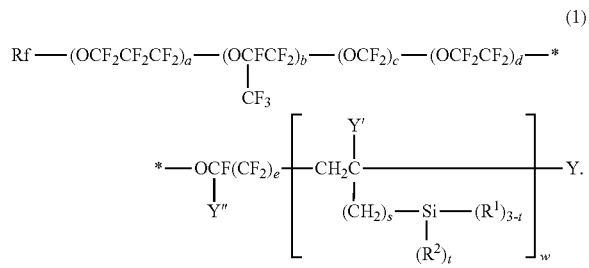

(1)

In formula (1), Rf represents a linear or branched perfluoroalkyl group having 1 to 16 carbon atoms, Y represents iodine or hydrogen, Y' represents hydrogen or a lower alkyl group, Y" represents fluorine or a trifluoromethyl group, $R^1$ represents a hydrolyzable group, $R^2$ represents hydrogen or an inert monovalent organic group, a, b, c and d each represent an integer of 0 to 200, e represents 0 or 1, s and t each represent an integer of 0 to 2 and w represents an integer of 1 to 10.

[Chemical Formula 2]

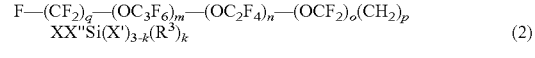

(2)

[Chemical Formula 3]

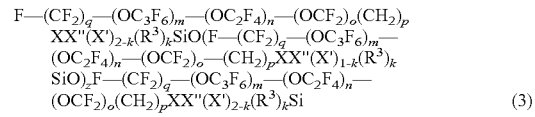

(3)

[Chemical Formula 4]

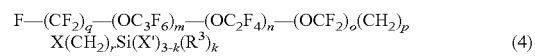

(4)

[Chemical Formula 5]

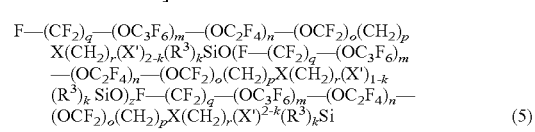

(5)

In formulae (2) to (5), X represents oxygen or a bivalent organic group, X' represents a hydrolyzable group, X" represents a bivalent organic silicone group, $R^3$ represents a linear or branched alkylene group having 1 to 22 carbon atoms, q represents an integer of 1 to 3, m, n and o each represent an integer of 0 to 200, p represents 1 or 2, r represents an integer of 2 to 20, k represents an integer of 0 to 2 and z represents an integer of 0 to 10 where k is 0 or 1.

[Chemical Formula 6]

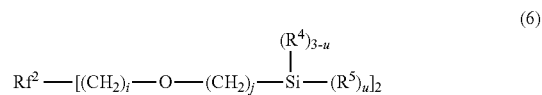

(6)

In formula (6), $Rf^2$ represents a divalent linear perfluoropolyether group, $R^4$ represents an alkyl group having 1 to 4 carbon atoms or a phenyl group, $R^5$ represents a hydrolyzable group, i represents an integer of 0 to 2, j represents an integer of 1 to 5 and u represents 2 or 3.

In order to impart improved durability to the water-oil-repelling film, it is preferable to employ a combination of a fluorine-substituted alkyl group-containing organic silicon compound selected from those represented by the general formulae (1) to (5) and a fluorine-substituted alkyl group-containing organic silicon compound selected from that represented by the general formula (6).

Examples of the fluorine-substituted alkyl group-containing organic silicon compound represented by the general formulae (1) to (5) may include OPTOOL DSX and OPTOOL AES4 manufactured by Daikin Industries, LTD. Examples of the fluorine-substituted alkyl group-containing organic silicon compound represented by the general formula (6) may include KY-130 and KY-164 manufactured by Shin-Etsu Chemical Co., Ltd.

The water-oil-repelling film may be deposited by a wet process including dipping, spin coating and spraying and a dry process including vacuum deposition.

A frequently used wet process is dipping. In the dipping process, a lens having an antireflection film deposited thereon is immersed in a solution obtained by dissolving a fluorine-substituted alkyl group-containing organic silicon compound in an organic solvent. The lens is taken out under a certain condition so that the solution is applied to the lens. The organic solvent may be perfluorohexane, perfluoro-4-methoxybutane, perfluoro-4-ethoxy butane, and metaxylene hexafluoride.

Concentration of the fluorine-substituted alkyl group-containing organic silicon compound in the organic solvent is preferably 0.01 to 0.5% by weight and more preferably 0.03 to 0.1% by weight. An excessively low concentration would result in a water-oil-repelling layer of an insufficient film thickness. An excessively high concentration, on the other hand, would result in uneven application of the solution and increased material cost.

A frequently used dry process is vacuum deposition. In the vacuum deposition process, a fluorine-substituted alkyl group-containing organic silicon compound is heated to evaporate in a vacuum chamber so as to deposit a water-oil-repelling layer.

In the foregoing first to third embodiments, the number of the layers (i.e., the high refractive index layers and the low refractive index layers) which constitute the antireflection film may be arbitrarily defined to be not less than six and be an even number as long as the foregoing conditions are satisfied. In that case, the condition (3A) described above may be applied to the optical thickness of the layer of the antireflection film that is located fifth from the outermost layer deposited furthest from the substrate. Alternatively, the condition (3) may be applied to the optical thickness of the fourth layer of the antireflection film which is deposited fourth-closest to the substrate.

(Fourth Embodiment)

Hereinafter, Experiments conducted to evaluate performance of the optical component according to the invention and the results thereof will be described.

(Experiment 1)

A hard-coat layer 13 having the refractive index (nd) of 1.67 was deposited on a substrate 11 having the refractive index of 1.67. An antireflection film was vacuum deposited on the hard-coat layer 13 in the following manner. The substrate 11 was first placed on a holding member 34. Inside of a chamber of a vapor deposition apparatus 30 was heated to 70° C. and then exhausted to $1.0 \times 10^{-3}$ Pa. Ar ion beam cleaning was performed for 60 seconds at the acceleration voltage of 500 V and the accelerating current of 100 mA. Then, high refractive index layers and low refractive index layers were laminated alternately on the substrate 11 using the vapor deposition apparatus 30.

Subsequently, a water-oil-repelling film was deposited on a surface of the antireflection film in the following manner.

995 g of fluorine-based solvent NOVEC HFE7200 manufactured by 3M was placed in a beaker, in which 2.5 g of OPTOOL AES4 (a solution having concentration of the water- and oil-repellent agent: 20%) and 2.5 g of KY-164 (concentration of the water- and oil-repellent agent: 20%) were dissolved. Concentration of the water- and oil-repellent agent was 0.1% by weight. In the thus-obtained solution, a plastic lens having the antireflection film deposited thereon was immersed for 10 seconds and then taken out at the speed of 8 mm/second. The lens was stabilized at 50° C. for an hour to complete the lens having the water-oil-repelling film deposited thereon.

Antireflection films which satisfy the conditions according to the invention were deposited on the substrate 11 as Examples 1 and 2. In Examples 1 and 2, the antireflection film had first to eighth layers. Among these, the first layer was a high refractive index layer ($ZrO_2$) and the eighth layer was a low refractive index layer ($SiO_2$). An antireflection film which does not satisfy the conditions according to the invention was deposited on the substrate 11 as Comparative Example 1. In Comparative Example 1, the antireflection film had first to fifth layers. Among these, the first layer was a low refractive index layer ($SiO_2$) and the first layer was a high refractive index layer ($ZrO_2$).

EXAMPLE 1

Figure 5:
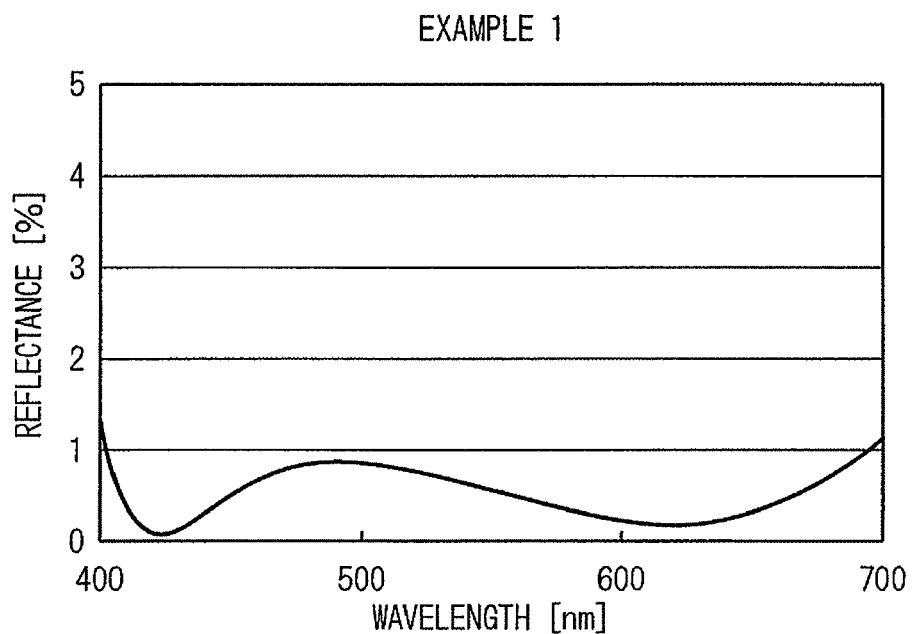
FIG. 5 is a spectral characteristic diagram of an antireflection film according to Example 1.

The following first to eighth layers were laminated together. The first layer was $ZrO_2$ (refractive index: 2.00) and had the optical thickness of $0.02\lambda$. The second layer was $SiO_2$ (refractive index: 1.47) and had the optical thickness of $0.15\lambda$. The third layer was $ZrO_2$ (refractive index: 2.00) and had the optical thickness of $0.06\lambda$. The fourth layer was $SiO_2$ (refractive index: 1.47) and had the optical thickness of $0.25\lambda$. The fifth layer was $ZrO_2$ (refractive index: 2.00) and had the optical thickness of $0.14\lambda$. The sixth layer was $SiO_2$ (refractive index: 1.47) and had the optical thickness of $0.07\lambda$. The seventh layer was $ZrO_2$ (refractive index: 2.00) and had the optical thickness of $0.28\lambda$. The eighth layer was $SiO_2$ (refractive index: 1.47) and had the optical thickness of $0.27\lambda$. $\lambda$ was the center wavelength of design and was 500 nm. FIG. 5 is a spectral characteristic diagram of the antireflection film according to Example 1. In FIG. 5, the horizontal axis represents the wavelength of light incident into the antireflection film and the vertical axis represents reflectance of the antireflection film.

EXAMPLE 2

Figure 6:
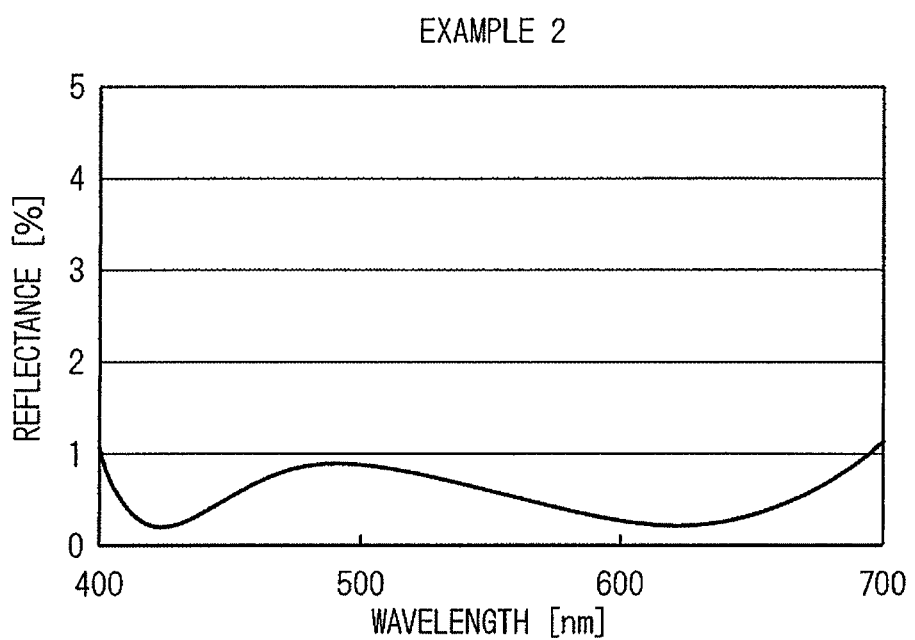
FIG. 6 is a spectral characteristic diagram of an antireflection film according to Example 2.

The following first to eighth layers were laminated together. The first layer was $ZrO_2$ (refractive index: 2.00) and had the optical thickness of $0.02\lambda$. The second layer was $SiO_2$ (refractive index: 1.47) and had the optical thickness of $0.12\lambda$. The third layer was $ZrO_2$ (refractive index: 2.00) and had the optical thickness of $0.04\lambda$. The fourth layer was $SiO_2$ (refractive index: 1.47) and had the optical thickness of $0.50\lambda$. The fifth layer was $ZrO_2$ (refractive index: 2.00) and had the optical thickness of $0.12\lambda$. The sixth layer was $SiO_2$ (refractive index: 1.47) and had the optical film thickness of $0.07\lambda$. The seventh layer was $ZrO_2$ (refractive index: 2.00) and had the optical thickness of $0.28\lambda$. The eighth layer was $SiO_2$ (refractive index: 1.47) and had the optical thickness of $0.27\lambda$. $\lambda$ was the center wavelength of design and was 500 nm FIG. 6 is a spectral characteristic diagram of the antireflection film according to Example 2. In FIG. 6, the horizontal axis represents the wavelength of light incident into the antireflection film and the vertical axis represents reflectance of the antireflection film.

COMPARATIVE EXAMPLE 1

Figure 7:
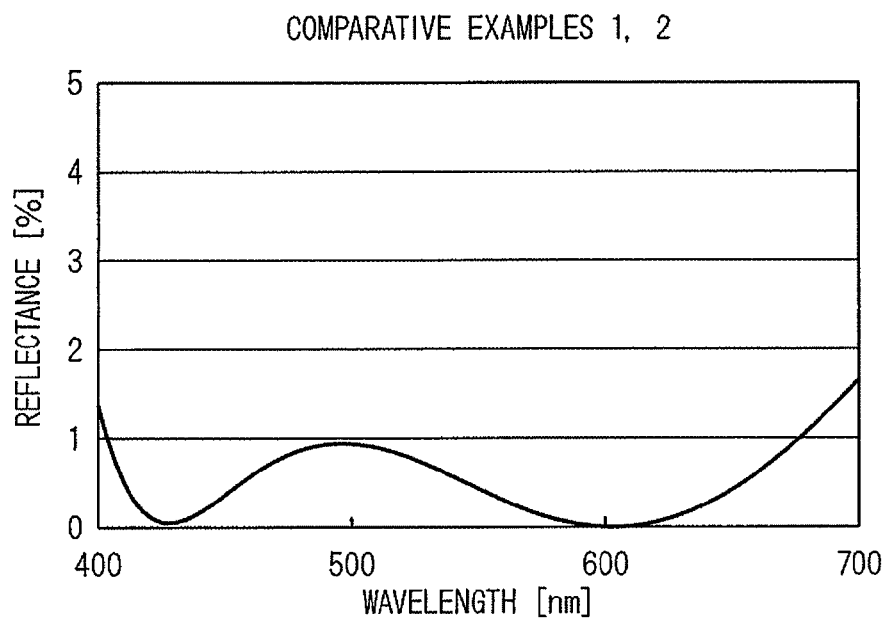
FIG. 7 is a spectral characteristic diagram of antireflection films according to Comparative Examples 1 and 2.

The following first to fifth layers were laminated together. The first layer was $SiO_2$ (refractive index: 1.47) and had the optical thickness of $0.10\lambda$. The second layer was $ZrO_2$ (refractive index: 2.00) and had the optical thickness of $0.16\lambda$. The third layer was $SiO_2$ (refractive index: 1.47) and had the optical thickness of $0.06\lambda$. The fourth layer was $ZrO_2$ (refractive index: 2.00) and had the optical thickness of $0.25\lambda$. The fifth layer was $SiO_2$ (refractive index: 1.47) and had the optical thickness of $0.28\lambda$. $\lambda$ was the center wavelength of design and was 500 nm. FIG. 7 is a spectral characteristic diagram of the antireflection film according to Comparative Example 1. In FIG. 7, the horizontal axis represents the wavelength of light incident into the antireflection film and the vertical axis represents reflectance of the antireflection film.

The conditions for Examples 1 and 2 and Comparative Example 1 are shown in Table 1.

TABLE 1

<EXPERIMENT 1: SUBSTRATE REFRACTIVE INDEX: 1.67, ACCELERATION VOLTAGE: 500 V, CLEANING: 60 SECONDS>

| | <EXAMPLE 1> | | | <EXAMPLE 2> | | |
|---|---|---|---|---|---|---|
| | MATERIAL | OPTICAL FILM THICKNESS | PHYSICAL FILM THICKNESS [nm] | MATERIAL | OPTICAL FILM THICKNESS | PHYSICAL FILM THICKNESS [nm] |
| FIRST LAYER | $ZrO_2$ | $0.02\lambda$ | 5 | $ZrO_2$ | $0.02\lambda$ | 5 |
| SECOND LAYER | $SiO_2$ | $0.15\lambda$ | 51 | $SiO_2$ | $0.12\lambda$ | 41 |
| THIRD LAYER | $ZrO_2$ | $0.06\lambda$ | 15 | $ZrO_2$ | $0.04\lambda$ | 10 |
| FOURTH LAYER | $SiO_2$ | $0.25\lambda$ | 85 | $SiO_2$ | $0.50\lambda$ | 170 |
| FIFTH LAYER | $ZrO_2$ | $0.14\lambda$ | 35 | $ZrO_2$ | $0.12\lambda$ | 29 |
| SIXTH LAYER | $SiO_2$ | $0.07\lambda$ | 24 | $SiO_2$ | $0.07\lambda$ | 24 |
| SEVENTH LAYER | $ZrO_2$ | $0.28\lambda$ | 70 | $ZrO_2$ | $0.28\lambda$ | 70 |
| EIGHTH LAYER | $SiO_2$ | $0.27\lambda$ | 92 | $SiO_2$ | $0.27\lambda$ | 92 |
| | | TOTAL FILM THICKNESS | 377 | | TOTAL FILM THICKNESS | 441 |
| | | $SiO_2$ RATIO | 67% | | $SiO_2$ RATIO | 74% |

| | <COMPARATIVE EXAMPLE 1> | | |
|---|---|---|---|
| | MATERIAL | OPTICAL FILM THICKNESS | PHYSICAL FILM THICKNESS [nm] |
| FIRST LAYER | $SiO_2$ | $0.10\lambda$ | 30 |
| SECOND LAYER | $ZrO_2$ | $0.16\lambda$ | 37 |
| THIRD LAYER | $SiO_2$ | $0.06\lambda$ | 20 |
| FOURTH LAYER | $ZrO_2$ | $0.25\lambda$ | 58 |
| FIFTH LAYER | $SiO_2$ | $0.28\lambda$ | 93 |
| SIXTH LAYER | | | |
| SEVENTH LAYER | | | |
| EIGHTH LAYER | | | |
| | TOTAL FILM THICKNESS | | 238 |
| | $SiO_2$ RATIO | | 60% |

Next, performance tests were conducted on the optical components according to Examples 1 and 2 and Comparative Example 1.

(Abrasive Resistance Test 1)

For each optical component, a surface thereof was rubbed with steel wool 50 times under a load of 1,000 g. Abrasive resistance was evaluated for each of the optical components. Criteria were as follows:

sign of double circle: no abrasion found;

sign of single circle: few abrasion found; and sign of x: abrasion found.

(Heat Resistance and Cracking Temperature Test)

Each of the optical components was placed in a 60° C. warm air oven. The optical component was visually examined with the temperature continuously rising by 10° C.

(Load Resistance and Cracking Pressure Test)

A load was applied perpendicularly to a surface of each optical component beginning with 30 kg. The optical component was visually examined with the load continuously increasing by 10 kg.

Results of the performance tests of the optical components according to Examples 1 and 2 and Comparative Example 1 are shown in Table 2.

TABLE 2

| EXAMPLE | ABRASIVE RESISTANCE 1 | HEAT RESISTANCE AND CRACKING TEMPERATURE | LOAD RESISTANCE AND CRACKING PRESSURE |
|---|---|---|---|
| COMPARATIVE EXAMPLE 1 | ◯ | 110° C. | 60 kg |
| EXAMPLE 1 | ◉ | 110° C. | 70 kg |
| EXAMPLE 2 | ◉ | 120° C. | 80 kg |

(Experiment 2)

A hard-coat layer 13 having the refractive index (nd) of 1.67 was deposited on a substrate 11 having the refractive index of 1.74. An antireflection film was vacuum deposited on the hard-coat layer 13 in the following manner. The substrate 11 was first placed on a holding member 34. Inside of a chamber of a vapor deposition apparatus 30 was heated to 70° C. and then exhausted to $1.0 \times 10^{-3}$ Pa. Ar ion beam cleaning was performed for 90 seconds at the acceleration voltage of 400 V and the accelerating current of 100 mA. Then, high refractive index layers and low refractive index layers were laminated alternately on the substrate 11 using the vapor deposition apparatus 30.

Subsequently, a water-oil-repelling film was deposited on a surface of the antireflection film in the same manner as in Example 1.

Antireflection films which satisfy the conditions according to the invention were deposited on the substrate 11 as Example 3. In Example 3, the antireflection film had first to eighth layers. Among these, the first layer was a high refractive index layer ($ZrO_2$) and the eighth layer was a low refractive index layer ($SiO_2$). An antireflection film which does not satisfy the conditions according to the invention was deposited on the substrate 11 as Comparative Example 2. In Comparative Example 2, the antireflection film had first to fifth layers. Among these, the first layer was a low refractive index layer ($SiO_2$) and the first layer was a high refractive index layer ($ZrO_2$).

EXAMPLE 3

Figure 8:
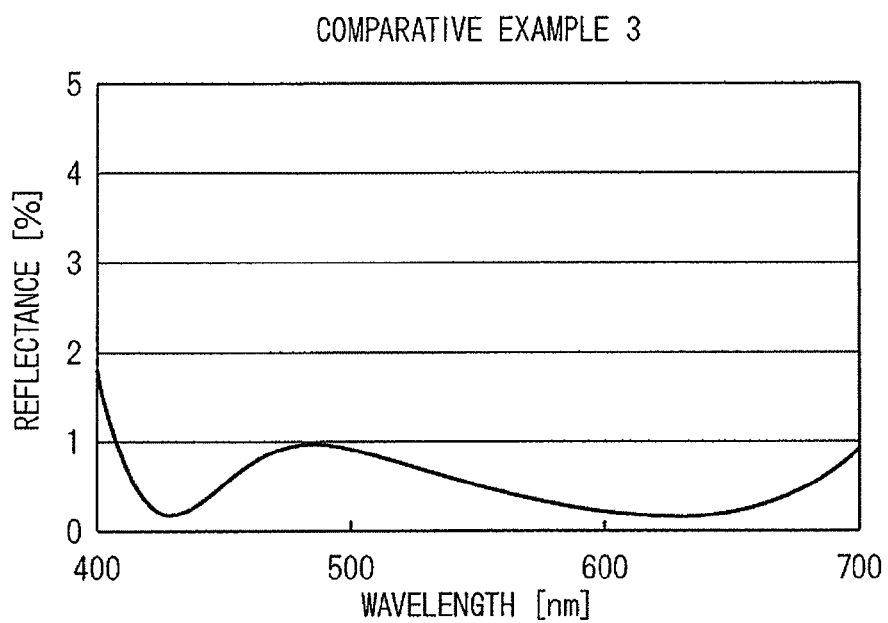
FIG. 8 is a spectral characteristic diagram of an antireflection film according to Example 3.

The following first to eighth layers were laminated together. The first layer was $ZrO_2$ (refractive index: 2.00) and had the optical thickness of 0.04λ. The second layer was $SiO_2$ (refractive index: 1.47) and had the optical thickness of 0.14λ. The third layer was $ZrO_2$ (refractive index: 2.00) and had the optical thickness of 0.05λ. The fourth layer was $SiO_2$ (refractive index: 1.47) and had the optical thickness of 0.50λ. The fifth layer was $ZrO_2$ (refractive index: 2.00) and had the optical thickness of 0.11λ. The sixth layer was $SiO_2$ (refractive index: 1.47) and had the optical film thickness of 0.06λ. The seventh layer was $ZrO_2$ (refractive index: 2.00) and had the optical thickness of 0.26λ. The eighth layer was $SiO_2$ (refractive index: 1.47) and had the optical thickness of 0.27λ. λ was the center wavelength of design and was 500 nm. FIG. 8 is a spectral characteristic diagram of the antireflection film according to Example 3. In FIG. 8, the horizontal axis represents the wavelength of light incident into the antireflection film and the vertical axis represents reflectance of the antireflection film.

COMPARATIVE EXAMPLE 2

The following first to fifth layers were laminated together. The first layer was $SiO_2$ (refractive index: 1.47) and had the optical thickness of 0.10λ. The second layer was $ZrO_2$ (refractive index: 2.00) and had the optical thickness of 0.16λ. The third layer was $SiO_2$ (refractive index: 1.47) and had the optical thickness of 0.06λ. The fourth layer was $ZrO_2$ (refractive index: 2.00) and had the optical thickness of 0.25λ. The fifth layer was $SiO_2$ (refractive index: 1.47) and had the optical thickness of 0.28λ. λ was the center wavelength of design and was 500 nm. The spectral characteristic of the antireflection film according to Comparative Example 2 was substantially the same as that of the antireflection film according to Comparative Example 1.

The conditions for Example 3 and Comparative Example 2 are shown in Table 3.

TABLE 3

<EXPERIMENT 1: SUBSTRATE REFRACTIVE INDEX: 1.74, ACCELERATION VOLTAGE: 400 V, CLEANING: 90 SECONDS>

| | <EXAMPLE 3> | | | <COMPARATIVE EXAMPLE 2> | | |
|---|---|---|---|---|---|---|
| | MATERIAL | OPTICAL FILM THICKNESS | PHYSICAL FILM THICKNESS [nm] | MATERIAL | OPTICAL FILM THICKNESS | PHYSICAL FILM THICKNESS [nm] |
| FIRST LAYER | $ZrO_2$ | 0.04λ | 10 | $SiO_2$ | 0.10λ | 30 |
| SECOND LAYER | $SiO_2$ | 0.14λ | 48 | $ZrO_2$ | 0.16λ | 37 |
| THIRD LAYER | $ZrO_2$ | 0.05λ | 12 | $SiO_2$ | 0.06λ | 20 |
| FOURTH LAYER | $SiO_2$ | 0.50λ | 170 | $ZrO_2$ | 0.25λ | 58 |
| FIFTH LAYER | $ZrO_2$ | 0.11λ | 28 | $SiO_2$ | 0.28λ | 93 |
| SIXTH LAYER | $SiO_2$ | 0.06λ | 20 | | | |
| SEVENTH LAYER | $ZrO_2$ | 0.26λ | 65 | | | |
| EIGHTH LAYER | $SiO_2$ | 0.27λ | 90 | | | |
| TOTAL FILM THICKNESS | | | 443 | | | 238 |
| $SiO_2$ RATIO | | | 74% | | | 60% |

Next, performance tests were conducted on the optical components according to Example 3 and Comparative Example 2. The tests were conducted in the same manner as in the foregoing tests.

Results of the performance tests of the optical components according to Example 3 and Comparative Example 2 are shown in Table 4.

TABLE 4

| EXAMPLE | ABRASIVE RESISTANCE 1 | HEAT RESISTANCE AND CRACKING TEMPERATURE | LOAD RESISTANCE AND CRACKING PRESSURE |
| --- | --- | --- | --- |
| COMPARATIVE EXAMPLE 2 | ○ | 100° C. | 50 kg |
| EXAMPLE 3 | ◉ | 110° C. | 60 kg |

Experiments 1 and 2 demonstrated that Examples 1 to 3 are excellent in abrasive resistance, heat and cracking resistance and load and cracking resistance as compared with Comparative Examples 1 and 2. As a result, an antireflection film of excellent antireflection performance with improved durability and optical properties was provided. A higher the ratio (i.e., a $SiO_2$ ratio) of the total physical thickness of the low refractive index layers in the film thickness of the antireflection film may provide improved durability.

Note that insofar as it is permitted by law, the disclosures of all publications and US patents relating to the exposure apparatuses, etc. cited in the above respective embodiments and modification examples will be invoked and considered a part of the descriptions of the present document.

What is claimed is:

1. An optical component comprising:
    a plastic substrate; and
    an antireflection film disposed on the substrate, wherein
        the antireflection film is a multilayer film having alternately-laminated six or more layers including high refractive index layers and low refractive index layers;
        a first layer of the antireflection film deposited closest to the substrate is a high refractive index layer;
        $\lambda$ satisfies 480 nm$\leq\lambda\leq$530 nm where $\lambda$ is the wavelength of light incident into the antireflection film;
        an optical thickness D1 of the first layer satisfies $0.02\lambda\leq D1\leq 0.04\lambda$;
        an optical thickness Dm of a layer of the antireflection film that is located fifth from an outermost layer deposited furthest from the substrate satisfies $0.19\lambda\leq Dm\leq 0.75\lambda$, wherein the layer is a low refractive index layer;
        a total physical thickness dt of the entire antireflection film satisfies 350 nm$\leq dt\leq$480 nm; and
        a total physical thickness da of the low refractive index layers satisfies 0.65 dt$\leq$da$\leq$0.80 dt.

2. The optical component according to claim 1, further comprising a water-oil-repelling film provided on the outermost layer of the antireflection film deposited furthest from the substrate, the water-oil-repelling film including a fluorine-substituted alkyl group-containing organic silicon compound.

3. The optical component according to claim 2, wherein the fluorine-substituted alkyl group-containing organic silicon compound is one or more fluorine-substituted alkyl group-containing organic silicon compounds selected from the group consisting of those represented by general formulae (1) to (6),

[Chemical Formula 1]

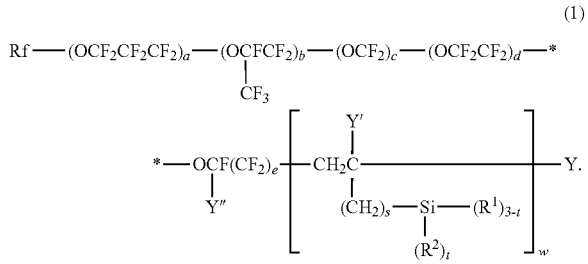

(1)

where, in formula (1), Rf represents a linear or branched perfluoroalkyl group having 1 to 16 carbon atoms, Y represents iodine or hydrogen, Y' represents hydrogen or a lower alkyl group, Y" represents fluorine or a trifluoromethyl group, $R^1$ represents a hydrolyzable group, $R^2$ represents hydrogen or an inert monovalent organic group, a, b, c and d each represent an integer of 0 to 200, e represents 0 or 1, s and t each represent an integer of 0 to 2 and w represents an integer of 1 to 10,

[Chemical Formula 2]

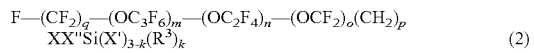

(2)

[Chemical Formula 3]

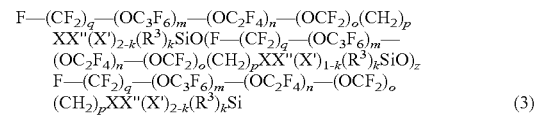

(3)

[Chemical Formula 4]

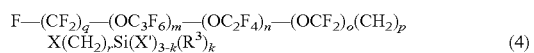

(4)

[Chemical Formula 5]

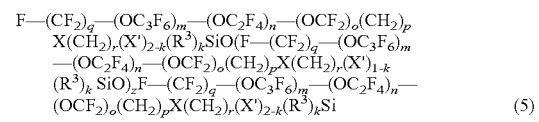

(5)

where in formulae (2) to (5), X represents oxygen or a bivalent organic group, X' represents a hydrolyzable group, X" represents a bivalent organic silicone group, $R^3$ represents a linear or branched alkylene group having 1 to 22 carbon atoms, q represents an integer of 1 to 3, m, n and o each represent an integer of 0 to 200, p represents 1 or 2, r represents an integer of 2 to 20, k represents an integer of 0 to 2 and z represents an integer of 0 to 10 where k is 0 or 1,

[Chemical Formula 6]

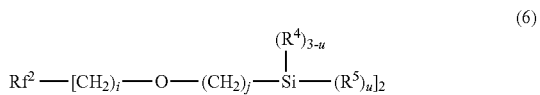

(6)

in formula (6), $Rf^2$ represents a divalent linear perfluoropolyether group, $R^4$ represents an alkyl group having 1 to 4 carbon atoms or a phenyl group, $R^5$ represents a hydrolyzable group, i represents an integer of 0 to 2, j represents an integer of 1 to 5 and u represents 2 or 3.

4. The optical component according to any one of claims 1 to 3, wherein the antireflection film is a multilayer film having eight layers.

5. The optical component of claim 1, wherein:
the high refractive index layer includes zirconium oxide; and
the low refractive index layer includes silicon dioxide.

6. The optical component of claim 1, wherein the optical component is used in a spectacle lens.

7. An optical component according to claim 1, further comprising an intermediate layer disposed between the substrate and the first layer of the antireflection film.

* * * * *